(12) United States Patent
Biddick et al.

(10) Patent No.: US 10,630,139 B2
(45) Date of Patent: Apr. 21, 2020

(54) THRUST LOAD SUPPORT FOR DOWNHOLE-TYPE SYSTEM

(71) Applicant: Upwing Energy, LLC, Cerritos, CA (US)

(72) Inventors: David Biddick, Houston, TX (US); Patrick McMullen, Villa Park, CA (US); Kuo-Chiang Chen, Kennedale, TX (US)

(73) Assignee: Upwing Energy, LLC, Cerritos, CA (US)

(*) Notice: Subject to any disclaimer, the term of this patent is extended or adjusted under 35 U.S.C. 154(b) by 0 days.

(21) Appl. No.: 15/974,460

(22) Filed: May 8, 2018

(65) Prior Publication Data

US 2019/0085671 A1 Mar. 21, 2019

Related U.S. Application Data

(60) Provisional application No. 62/561,067, filed on Sep. 20, 2017.

(51) Int. Cl.
*H02K 7/09* (2006.01)
*H02K 11/225* (2016.01)
(Continued)

(52) U.S. Cl.
CPC .............. *H02K 7/09* (2013.01); *E21B 4/003* (2013.01); *E21B 4/02* (2013.01); *E21B 4/04* (2013.01);
(Continued)

(58) Field of Classification Search
CPC .......... H02K 7/09; H02K 7/14; H02K 7/1807; H02K 11/21; H02K 11/27; H02K 11/30; H02K 1/2793; H02K 3/42; H02K 5/132; H02K 21/14; H02P 29/40; E21B 4/003; E21B 4/02; E21B 4/04; E21B 17/028; E21B 41/0085; E21B 43/121; E21B 43/128; E21B 47/0007; E21B 47/01; E21B 47/06; E21B 47/09; E21B 47/12; F04B 17/03;
(Continued)

(56) References Cited

U.S. PATENT DOCUMENTS

| 5,126,610 | A | * | 6/1992 | Fremerey | ................. D01H 4/12 |
| | | | | | 310/51 |
| 5,248,239 | A | * | 9/1993 | Andrews | ................... F01D 3/00 |
| | | | | | 415/104 |

(Continued)

FOREIGN PATENT DOCUMENTS

| EP | 0875685 | 11/1998 |
| GB | 2501352 B | 11/2017 |

OTHER PUBLICATIONS

PCT International Search Report and Written Opinion issued in International Application No. PCT/US2018/051892 dated Jun. 17, 2019, 15 pages.

*Primary Examiner* — Orlando Bousono
(74) *Attorney, Agent, or Firm* — Fish & Richardson P.C.

(57) ABSTRACT

A downhole-type system includes a rotatable rotor, a magnetic thrust bearing coupled to the rotor, and a mechanical thrust bearing coupled to the rotor. The magnetic thrust bearing is configured to support a first portion of an axial load of the rotor during rotor rotation, and the mechanical thrust bearing is configured to support a second portion of the axial load of the rotor during rotor rotation.

23 Claims, 6 Drawing Sheets

(51) Int. Cl.
| | |
|---|---|
| H02K 11/21 | (2016.01) |
| H02K 11/27 | (2016.01) |
| H02K 11/30 | (2016.01) |
| H02P 29/40 | (2016.01) |
| E21B 4/02 | (2006.01) |
| E21B 4/04 | (2006.01) |
| E21B 17/02 | (2006.01) |
| E21B 41/00 | (2006.01) |
| E21B 43/12 | (2006.01) |
| E21B 47/00 | (2012.01) |
| E21B 47/06 | (2012.01) |
| E21B 47/12 | (2012.01) |
| F04B 17/03 | (2006.01) |
| F04B 47/04 | (2006.01) |
| F04D 13/02 | (2006.01) |
| F04D 13/06 | (2006.01) |
| F04D 13/08 | (2006.01) |
| F04D 13/10 | (2006.01) |
| F04D 29/041 | (2006.01) |
| F04D 29/048 | (2006.01) |
| F04D 29/051 | (2006.01) |
| F16C 32/04 | (2006.01) |
| F16C 37/00 | (2006.01) |
| H02H 7/00 | (2006.01) |
| H02K 1/27 | (2006.01) |
| H02K 5/132 | (2006.01) |
| H02K 7/14 | (2006.01) |
| H02K 7/18 | (2006.01) |
| H02K 21/14 | (2006.01) |
| E21B 47/01 | (2012.01) |
| E21B 47/09 | (2012.01) |
| H02K 3/42 | (2006.01) |
| E21B 4/00 | (2006.01) |
| F16F 15/03 | (2006.01) |
| H02K 5/128 | (2006.01) |
| H02K 15/03 | (2006.01) |
| E21B 33/12 | (2006.01) |
| E21B 43/16 | (2006.01) |

(52) U.S. Cl.
CPC ........ *E21B 17/028* (2013.01); *E21B 41/0085* (2013.01); *E21B 43/121* (2013.01); *E21B 43/128* (2013.01); *E21B 47/0007* (2013.01); *E21B 47/01* (2013.01); *E21B 47/06* (2013.01); *E21B 47/09* (2013.01); *E21B 47/12* (2013.01); *F04B 17/03* (2013.01); *F04B 47/04* (2013.01); *F04D 13/026* (2013.01); *F04D 13/064* (2013.01); *F04D 13/0633* (2013.01); *F04D 13/08* (2013.01); *F04D 13/086* (2013.01); *F04D 13/10* (2013.01); *F04D 29/041* (2013.01); *F04D 29/048* (2013.01); *F04D 29/051* (2013.01); *F16C 32/0474* (2013.01); *F16C 32/0476* (2013.01); *F16C 37/005* (2013.01); *H02H 7/005* (2013.01); *H02K 1/2793* (2013.01); *H02K 3/42* (2013.01); *H02K 5/132* (2013.01); *H02K 7/14* (2013.01); *H02K 7/1807* (2013.01); *H02K 11/21* (2016.01); *H02K 11/225* (2016.01); *H02K 11/27* (2016.01); *H02K 11/30* (2016.01); *H02K 21/14* (2013.01); *H02P 29/40* (2016.02); *E21B 33/12* (2013.01); *E21B 43/168* (2013.01); *E21B 47/065* (2013.01); *F16C 32/044* (2013.01); *F16C 2380/26* (2013.01); *F16F 15/03* (2013.01); *H02K 5/128* (2013.01); *H02K 15/03* (2013.01); *H02K 2205/03* (2013.01)

(58) Field of Classification Search
CPC .... F04B 47/04; F04D 13/026; F04D 13/0633; F04D 13/064; F04D 13/08; F04D 13/086; F04D 13/10; F04D 29/041; F04D 29/048; F04D 29/051; F16C 32/044; F16C 32/0474; F16C 32/0476; F16C 37/005; H02H 7/005

See application file for complete search history.

(56) References Cited

U.S. PATENT DOCUMENTS

| | | | |
|---|---|---|---|
| 5,969,451 A * | 10/1999 | Lyons | F16C 32/0476 310/90.5 |
| 8,487,493 B2 | 7/2013 | Cunningham et al. | |
| 2009/0118567 A1 | 5/2009 | Siess | |
| 2012/0321438 A1* | 12/2012 | Vannini | F04D 13/08 415/1 |
| 2014/0111047 A1 | 4/2014 | Hashish et al. | |
| 2014/0377106 A1* | 12/2014 | Kozaki | F04D 19/042 417/423.12 |
| 2015/0114632 A1 | 4/2015 | Romer et al. | |
| 2015/0316097 A1* | 11/2015 | Park | F16C 32/0465 310/90.5 |
| 2017/0102030 A1* | 4/2017 | Schroeder | H02K 7/09 |
| 2019/0063494 A1* | 2/2019 | Kozaki | F16C 32/0455 |

* cited by examiner

THRUST LOAD SUPPORT FOR DOWNHOLE-TYPE SYSTEM

CROSS-REFERENCE TO RELATED APPLICATIONS

This application claims the benefit under 35 U.S.C. § 119(e) of U.S. Patent Application No. 62/561,067, entitled "Sealless Downhole System with Magnetically Supported Rotor," filed Sep. 20, 2017, which is incorporated herein by reference in its entirety.

TECHNICAL FIELD

This application relates to downhole-type artificial lift systems.

BACKGROUND

Most wells behave characteristically different over time due to geophysical, physical, and chemical changes in the subterranean reservoir that feeds the well. For example, it is common for well production to decline. This decline in production can be due to declining pressures in the reservoir, and can eventually reach a point where there is not enough pressure in the reservoir to economically realize production through the well to the surface. In some instances, a top side pump or compressor is used to extend the life of the well by decreasing pressure at the top of the well. In some instances, a downhole-type artificial lift system, such as an electric submersible pump or compressor, is used to extend the life of the well by increasing pressure within the well.

SUMMARY

This disclosure describes technologies relating to downhole-type systems with a magnetically supported rotor.

An example implementation of the subject matter described within this disclosure is a downhole-type system with the following features. The downhole-type system includes a rotatable rotor, a magnetic thrust bearing coupled to the rotor, and a mechanical thrust bearing coupled to the rotor. The magnetic thrust bearing is configured to support a first portion of an axial load of the rotor during rotor rotation, and the mechanical thrust bearing is configured to support a second portion of the axial load of the rotor during rotor rotation.

Aspects of the example implementation, which can be combined with the example implementation alone or in combination, include the following.

The magnetic thrust bearing can be configured to support an axial load up to an axial load threshold, and the mechanical thrust bearing can be configured to cooperate with the magnetic thrust bearing to support an axial load at least greater than the axial load threshold.

The magnetic thrust bearing can be configured to support dynamic loads, and the mechanical thrust bearing can be configured to support static loads.

The mechanical thrust bearing can be configured to support an axial load up to an axial load threshold, and the magnetic thrust bearing can be configured to cooperate with the mechanical thrust bearing to support an axial load at least greater than the axial load threshold.

In response to a change in the axial load of the rotor on the mechanical thrust bearing, the magnetic thrust bearing can be configured to apply an opposing axial load to the rotor during the rotor rotation to compensate for the change in the axial load on the mechanical thrust bearing.

The magnetic thrust bearing can be lubricant-free.

The magnetic thrust bearing can be configured to share an environment with the mechanical thrust bearing.

The magnetic thrust bearing can include a permanent magnet attached to the rotor and an actuator surrounding the rotor. The permanent magnet can be configured to generate a permanent magnetic field, and the actuator can be configured to generate a magnetic field in response to receiving an electric current.

The system can include a controller coupled to the magnetic thrust bearing, and the controller can be configured to determine an amount of axial force to apply to the rotor to maintain axial levitation of the rotor during the rotor rotation. The controller can be configured to allocate a first portion of the determined amount of axial force to the magnetic thrust bearing and a remaining portion of the determined amount of axial force to the mechanical thrust bearing. The controller can be configured to transmit a signal to the magnetic thrust bearing, in which the signal corresponds to the first portion of the determined amount of axial force.

The system can include a sensor configured to detect a pressure during the rotor rotation in a downhole location and generate, at the downhole location, a signal based on the detected pressure.

The sensor can include a generator configured to generate a voltage signal based on the detected pressure.

The system can include a sensor configured to detect an axial position of the rotatable rotor during the rotor rotation in a downhole location and generate, at the downhole location, a signal based on the detected axial position.

The sensor and the magnetic bearing can be fluidically exposed to a downhole environment.

The sensor can include one of an inductive sensor, a pressure sensor, or a force sensor.

The sensor can include a generator configured to generate a voltage signal based on the detected axial position.

The sensor can include a modulator configured to modulate the signal.

Another example implementation of the subject matter described within this disclosure is a method. A first portion of an axial load on a rotating rotor of a downhole-type rotating machine is supported using a magnetic thrust bearing. A second portion of the axial load of the rotating rotor is supported using a mechanical thrust bearing.

Aspects of the example implementation, which can be combined with the example implementation alone or in combination, include the following.

Supporting the first portion of the axial load using the magnetic thrust bearing can include supporting the axial load up to an axial load threshold, and supporting the second portion of the axial load using the mechanical thrust bearing can include supporting, by the mechanical thrust bearing in cooperation with the magnetic thrust bearing, an axial load that is at least greater than the axial load threshold.

Supporting the first portion of the axial load using the magnetic thrust bearing can include determining a change in axial load of the rotor on the mechanical thrust bearing and in response to determining the change in the axial load on the mechanical thrust bearing, applying, by the magnetic thrust bearing, an opposing axial load to the rotor during the rotor rotation to compensate for the change in the axial load on the mechanical thrust bearing.

The method can include generating a magnetic field in response to receiving an electric current and generating an axial force on the rotor in response to the generated magnetic field.

The method can include detecting an axial position of the rotating rotor in a downhole location and transmitting a position signal based on the detected axial position.

The method can include modulating the position signal before transmitting the position signal.

Another example implementation of the subject matter described within this disclosure is an electrical submersible pump that includes a stator, a rotor supported by the stator, and a bearing assembly, which includes a magnetic thrust bearing coupled to the rotor and a mechanical thrust bearing coupled to the rotor. The rotor is configured to rotate within the stator. The magnetic thrust bearing is configured to support a first portion of an axial load of the rotor during rotor rotation, and the mechanical thrust bearing is configured to support a second portion of the axial load of the rotor during rotor rotation.

Aspects of the example implementation, which can be combined with the example implementation alone or in combination, include the following.

The magnetic thrust bearing can be configured to support an axial load up to an axial load threshold, and the mechanical thrust bearing can be configured to cooperate with the magnetic thrust bearing to support an axial load at least greater than the axial load threshold.

In response to a change in axial load of the rotor on the mechanical thrust bearing, the magnetic thrust bearing is configured to apply an opposing axial load to the rotor during the rotor rotation to compensate for the change in the axial load on the mechanical thrust bearing.

The mechanical thrust bearing can be configured to support an axial load up to an axial load threshold, and the magnetic thrust bearing can be configured to cooperate with the mechanical thrust bearing to support an axial load at least greater than the axial load threshold.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF DRAWINGS

Like reference symbols in the various drawings indicate like elements.

DETAILED DESCRIPTION

Figure 1:
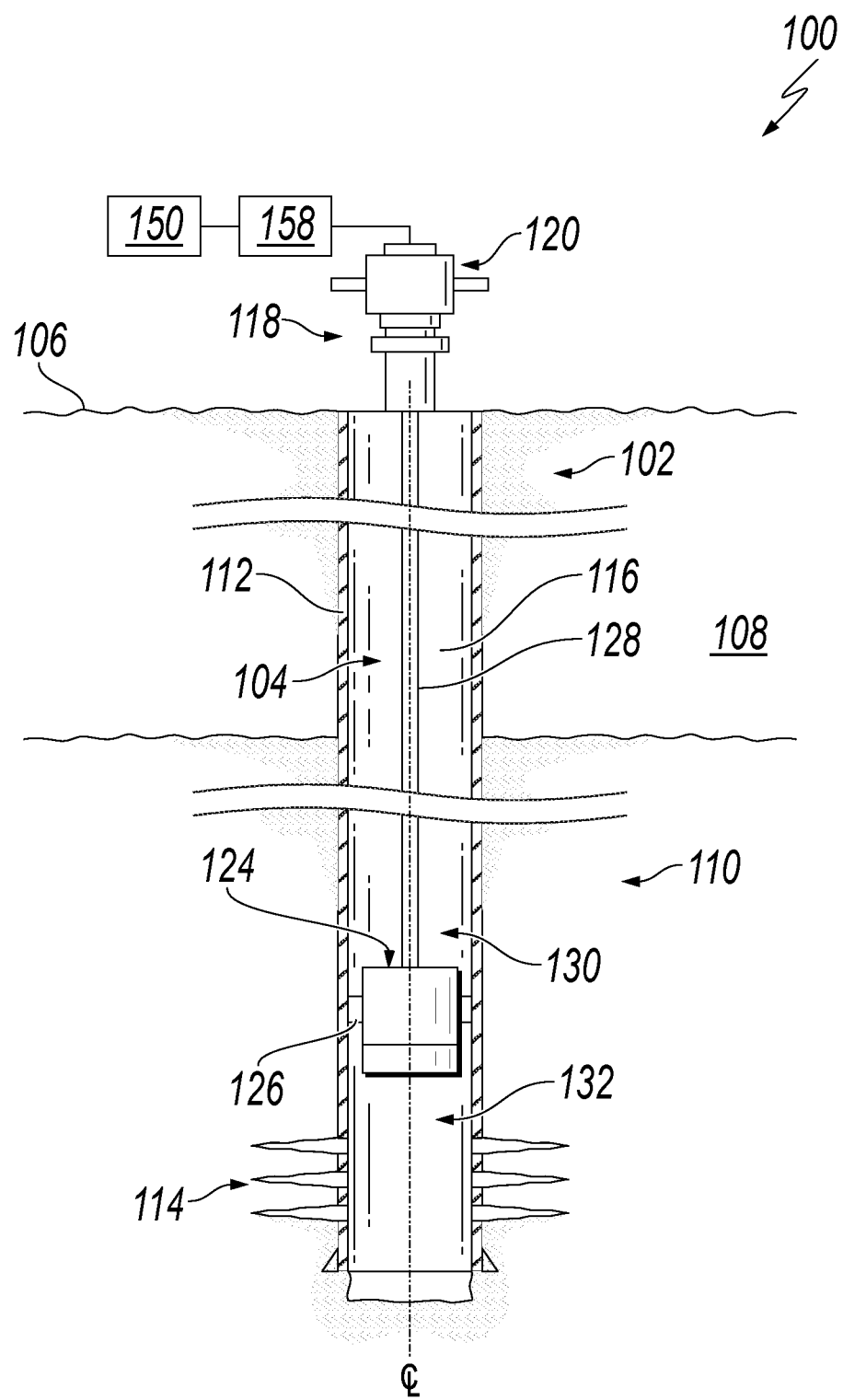
FIG. 1 is a schematic side view of an example well system.

In the downhole environment, it is difficult to install and operate any equipment due to the caustic fluids present, pressures, temperatures, and relative distance from any supporting equipment that cannot be repackaged to fit in a small diameter tube. In addition, any installation and removal of tools in the well requires the well to be "shut-down" or "killed" to prevent fluid flowing to the surface that can cause damage or injury, a very costly process not only in performing the work but also in lost production and risk in damaging the well where further production is jeopardized.

While all these issues and risk exist, the potential benefit of well intervention with production enhancing tools and measurement equipment is a prevalent industry because of the enhanced production it can offer. While these benefits have been demonstrated, reliability and robustness of equipment in this harsh environment is not close to conventional topside mounted equipment. The described invention is able to change this by utilizing a magnetic thrust bearing for thrust support. The use of the thrust magnetic bearing system allows for adequate operating clearances between rotating and nonrotating parts for fluid to pass, eliminating the need for seals, barrier fluid systems or protection bag/bellow systems. Particulate material in process fluid is free to flow through the clearances. For example, particulates can be approximately 1-4 mm in size. The use of this system can also provide operational data for the well currently unavailable, or only available with additional sensor systems. For example, an active thrust bearing can provide data on operating pressure during operation and liquid/gas content in the well. The device consists of only high temperature components to allow survival in high temperature environments present in deep wells. The device can utilize fully isolated rotor and stator parts to protect any materials and components that would be adversely affected by the process fluids. This provides the isolation for allowing the process fluid to flow into and through the motor and bearings.

In downhole applications, the process fluid can contain many different gases and liquids with variations in fluid characteristics, which can greatly affect the loads on downhole devices. Downhole devices can be used for pumping, compressing, or blowing well fluids to enhance fluid recovery and process flow from a well. The speed at which these downhole rotating devices spin can be determined, for example, by the characteristics of the fluid being extracted from the wellbore. In some cases, the rotation speed ranges from 3,000 revolutions per minute (rpm) to 60,000 rpm, or even as high as 120,000 rpm.

Axial bearings, such as fluid film mechanical bearings, typically operate in barrier fluid, as they handle high axial loads and require clean fluid to operate reliably for long durations of time. Sharp load fluctuations, which can occur with electrical submersible pumps encountering gas pockets in the process fluid being pumped, can cause significant axial load deviations that must be handled by the thrust bearings. Fluid film bearings can suffer from such load fluctuations and their operating lives can be shortened due to such upset events. As mentioned previously, well intervention to remove and re-install such devices is typically very expensive, and maintenance can, in many cases, cost more than the cost of the device itself.

FIG. 1 depicts an example well system 100 constructed in accordance with the concepts herein. The well system 100 includes a well 102 having a wellbore 104 that extends from the surface 106 through the Earth 108 to one more subterranean zones of interest 110 (one shown). The well system 100 enables access to the subterranean zones of interest 110 to allow recovery, i.e., production, of fluids to the surface 106 and, in certain instances, additionally or alternatively allows fluids to be placed in the earth 108. In certain instances, the subterranean zone 110 is a formation within the Earth 108 defining a reservoir, but in other instances, the zone 110 can be multiple formations or a portion of a formation. For simplicity's sake, the well 102 is shown as a vertical well with a vertical wellbore 104, but in other instances, the well 102 could be a deviated well with the wellbore 104 deviated from vertical (e.g., horizontal or slanted) and/or the wellbore 104 could be one of the multiple bores of a multilateral well (i.e., a well having multiple lateral wells branching off another well or wells).

In certain instances, the well system 100 is a gas well that is used in producing natural gas from the subterranean zones of interest 110 to the surface 106. While termed a "gas well," the well need not produce only dry gas, and may incidentally or in much smaller quantities, produce liquid including oil and/or water. In certain instances, the production from the well 102 can be multiphase in any ratio, and/or despite being a gas well, the well can produce mostly or entirely liquid at certain times and mostly or entirely gas at other times. For example, in certain types of wells it is common to produce water for a period of time to gain access to the gas in the subterranean zone. The concepts herein, though, are not limited in applicability to gas wells or even production wells, and could be used in wells for producing liquid resources such as oil, water or other liquid resource, and/or could be used in injection wells, disposal wells or other types of wells used in placing fluids into the Earth.

The wellbore 104 is typically, although not necessarily, cylindrical. All or a portion of the wellbore 104 is lined with a tubing, i.e., casing 112. The casing 112 connects with a wellhead 118 at the surface 106 and extends downhole into the wellbore 104. The casing 112 operates to isolate the bore of the well 102, defined in the cased portion of the well 102 by the inner bore 116 of the casing 112, from the surrounding earth 108. The casing 112 can be formed of a single continuous tubing or multiple lengths of tubing joined (e.g., threadedly and/or otherwise) end-to-end. In FIG. 1, the casing 112 is perforated (i.e., having perforations 114) in the subterranean zone of interest 110 to allow fluid communication between the subterranean zone of interest 110 and the bore 116 of the casing 112. In other instances, the casing 112 is omitted or ceases in the region of the subterranean zone of interest 110. This portion of the wellbore 104 without casing is often referred to as "open hole."

The wellhead 118 defines an attachment point for other equipment of the well system 100 to be attached to the well 102. For example, FIG. 1 shows well 102 being produced with a Christmas tree 120 attached the wellhead 118. The Christmas tree 120 includes valves used to regulate flow into or out of the well 102.

The well system 100 also includes a downhole-type system 124 residing in the wellbore 104, for example, at a depth that is nearer to subterranean zone 110 than the surface 106. The downhole-type system 124, being of a type configured in size and robust construction for installation within a well 102, can be any type of equipment that can assist production of fluids to the surface 106 and out of the well 102 by creating an additional pressure differential within the well 102 or decrease the head or density of the downhole fluid column. For example, the downhole-type system 124 can be a pump, compressor, blower, or multi-phase fluid flow aid. In particular, casing 112 is commercially produced in a number of common sizes specified by the American Petroleum Institute (the "API), including 4½, 5, 5½, 6, 6⅝, 7, 7⅝, 16/8, 9⅝, 10¾, 11¾, 13⅜, 16, 116/8 and 20 inches, and the API specifies internal diameters for each casing size. The downhole-type system 124 can be configured to fit in, and (as discussed in more detail below) in certain instances, seal to the inner diameter of one of the specified API casing sizes. Of course, the downhole-type system 124 can be made to fit in and, in certain instances, seal to other sizes of casing or tubing or otherwise seal to the wall of the wellbore 104.

Additionally, as a downhole-type system 124, the construction of its components are configured to withstand the impacts, scraping, and other physical challenges the system 124 will encounter while being passed hundreds of feet/meters or even multiple miles/kilometers into and out of the wellbore 104. For example, the downhole-type system 124 can be disposed in the wellbore 104 at a depth of up to 20,000 feet (6,096 meters). Beyond just a rugged exterior, this encompasses having certain portions of any electronics being ruggedized to be shock resistant and remain fluid tight during such physical challenges and during operation. Additionally, the downhole-type system 124 is configured to withstand and operate for extended periods of time (e.g., multiple weeks, months or years) at the pressures and temperatures experienced in the wellbore 104, which temperatures can exceed 400° F./205° C. and pressures over 2,000 pounds per square inch, and while submerged in the well fluids (gas, water, or oil as examples). Finally, as a downhole-type system 124, the system 124 can be configured to interface with one or more of the common deployment systems, such as jointed tubing (i.e., lengths of tubing joined end-to-end, threadedly and/or otherwise), a sucker rod, coiled tubing (i.e., not-jointed tubing, but rather a continuous, unbroken and flexible tubing formed as a single piece of material), or wireline with or without an electrical conductor (i.e., a monofilament or multifilament wire rope with one or more electrical conductors, sometimes called e-line) and thus have a corresponding connector (for example, a jointed tubing connector, coiled tubing connector, or wireline connector). In FIG. 1, the system 124 is shown deployed on wireline 128.

A seal system 126 integrated or provided separately with a downhole system, as shown with the downhole-type system 124, divides the well 102 into an uphole zone 130 above the seal system 126 and a downhole zone 132 below the seal system 126. FIG. 1 shows the downhole-type system 124 positioned in the open volume of the bore 116 of the casing 112, and not within or a part of another string of tubing in the well 102. The wall of the wellbore 104 includes the interior wall of the casing 112 in portions of the wellbore 104 having the casing 112, and includes the open hole wellbore wall in uncased portions of the wellbore 104. Thus, the seal system 126 is configured to seal against the wall of the wellbore 104, for example, against the interior wall of the casing 112 in the cased portions of the wellbore 104 or against the interior wall of the wellbore 104 in the uncased, open hole portions of the wellbore 104. In certain instances, the seal system 126 can form a gas and liquid tight seal at the pressure differential the system 124 creates in the well 102. In some instances, the seal system 126 of the downhole-type system 124 seals against the interior wall of the casing 112 or the open hole portion of the wellbore 104. For example, the seal system 126 can be configured to at least partially seal against an interior wall of the wellbore 104 to separate (completely or substantially) a pressure in the wellbore 104 downhole of the seal system 126 of the downhole-type system 124 from a pressure in the wellbore 104 uphole of the seal system 126 of the downhole-type system 124. Although FIG. 1 includes both the downhole-type system 124, in other instances, additional components, such as a surface compressor, can be used in conjunction with the system 124 to boost pressure in the well 102.

In some implementations, the downhole-type system 124 can be implemented to alter characteristics of a wellbore by a mechanical intervention at the source. Alternatively, or in addition to any of the other implementations described in this specification, the downhole-type system 124 can be implemented as a high flow, low pressure rotary device for gas flow in sub-atmospheric wells. Alternatively, or in addition to any of the other implementations described in this specification, the downhole-type system 124 can be implemented in a direct well-casing deployment for production through the wellbore. Other implementations of the downhole-type system 124 as a pump, compressor, or multiphase combination of these can be utilized in the well bore to effect increased well production.

The downhole-type system 124 locally alters the pressure, temperature, and/or flow rate conditions of the fluid in the wellbore 104 proximate the system 124 (e.g., at the base of the wellbore 104). In certain instances, the alteration performed by the system 124 can optimize or help in optimizing fluid flow through the wellbore 104. As described above, the downhole-type system 124 creates a pressure differential within the well 102, for example, particularly within the wellbore 104 the system 124 resides in. In some instances, a pressure at the base of the wellbore 104 is a low pressure (e.g., sub-atmospheric); so unassisted fluid flow in the wellbore can be slow or stagnant. In these and other instances, the downhole-type system 124 introduced to the wellbore 104 adjacent the perforations 114 can reduce the pressure in the wellbore 104 near the perforations 114 to induce greater fluid flow from the subterranean zone 110, increase a temperature of the fluid entering the system 124 to reduce condensation from limiting production, and increase a pressure in the wellbore 104 uphole of the system 124 to increase fluid flow to the surface 106.

The downhole-type system 124 moves the fluid at a first pressure downhole of the system 124 to a second, higher pressure uphole of the system 124. The system 124 can operate at and maintain a pressure ratio across the system 124 between the second, higher uphole pressure and the first, downhole pressure in the wellbore. The pressure ratio of the second pressure to the first pressure can also vary, for example, based on an operating speed of the system 124.

The downhole-type system 124 can operate in a variety of downhole conditions of the wellbore 104. For example, the initial pressure within the wellbore 104 can vary based on the type of well, depth of the well 102, production flow from the perforations into the wellbore 104, and/or other factors. In some examples, the pressure in the wellbore 104 proximate a bottomhole location is sub-atmospheric, where the pressure in the wellbore 104 is at or below about 14.7 pounds per square inch absolute (psia), or about 101.3 kiloPascal (kPa). The system 124 can operate in sub-atmospheric wellbore pressures, for example, at wellbore pressure between 2 psia (13.8 kPa) and 14.7 psia (101.3 kPa). In some examples, the pressure in the wellbore 104 proximate a bottomhole location is much higher than atmospheric, where the pressure in the wellbore 104 is above about 14.7 pounds per square inch absolute (psia), or about 101.3 kiloPascal (kPa). The system 124 can operate in above atmospheric wellbore pressures, for example, at wellbore pressure between 14.7 psia (101.3 kPa) and 5,000 psia (34,474 kPa) or greater.

The downhole system, shown as the downhole-type system 124, includes a magnetic bearing controller 150 and an amplifier 158, which in some implementations are located topside to maximize reliability and serviceability. A digital signal processor (DSP) based or analog based controller receives the position signals from a sensor and/or sensor electronics within the downhole-type system 124 and uses this for input as part of its position control algorithm. The sensor can detect an axial position of a rotating shaft and send a signal, which corresponds to the detected position of the rotating shaft, to the controller 150, for example, across a connection (such as a cable or the wireline 128). This algorithm output is a current command to the amplifier 158 to drive coils of the active bearings within the downhole-type system 124, thus impacting a force on the rotor (details are explained in greater detail later within the disclosure). This loop typically happens very fast, on the order of 1,000-20,000 times a second depending on the system control requirements. In some cases, the sensor is configured to generate and transmit signals at a rate on the order of every 50 microseconds or faster.

This control system is also capable of interpreting the bearing requirements to estimate forces and fluid pressures in the well. For example, the control system can include a component that is sensitive to pressure, such as a diaphragm. The diaphragm can have a reference position and can move (that is, expand or contract) when an internal pressure of the diaphragm is different from an external pressure external to the diaphragm. The diaphragm can expand or contract until the internal pressure within the diaphragm matches the external pressure. The contraction or expansion of the diaphragm can affect the required voltage signal to the controller 150 in order to maintain the position of the rotor at a desired position. The change in the voltage signal due to the contraction or expansion of the diaphragm can be determined by the controller 150, which can then be used to determine the external pressure (for example, the fluid pressures in the well). In some cases, the control system can include a temperature-sensitive material. The temperature-sensitive material can have a reference state and can move (that is, expand or contract) with the temperature of the environment surrounding the temperature-sensitive material. Similarly, the contraction or expansion of the temperature-sensitive material can affect the required voltage signal to the controller 150 in order to maintain the position of the rotor at a desired position. The change in the voltage signal due to the contraction or expansion of the temperature-sensitive material can be determined by the controller 150, which can then be used to determine the temperature of the surrounding environment (for example, the temperature of the downhole location within the well).

An analog circuit based controller can also perform these functions. Having this DSP or analog circuit based controller topside allows for easy communication, service, improved up time for the system, as any issues can be resolved immediately via local or remote support. Downhole electronics are also an option either proximate to the device or at a location more thermally suitable. In a downhole implementation, the electronics can be packaged to isolate them from direct contact with the downhole environment. In some cases, the sensor and magnetic bearing actuator are not packaged or sealed from the downhole environment or location. For example, the sensor and magnetic bearing can be submerged in the downhole fluids that are being extracted from the subterranean zone 110, while the controller 150 and amplifier 158 are located at the surface 106 and not exposed to the downhole fluids. Although shown in FIG. 1 as being located at the surface 106, in some cases, the controller 150 and the amplifier 158 can be packaged downhole with the magnetic bearing actuator and sensor.

Figure 2A:
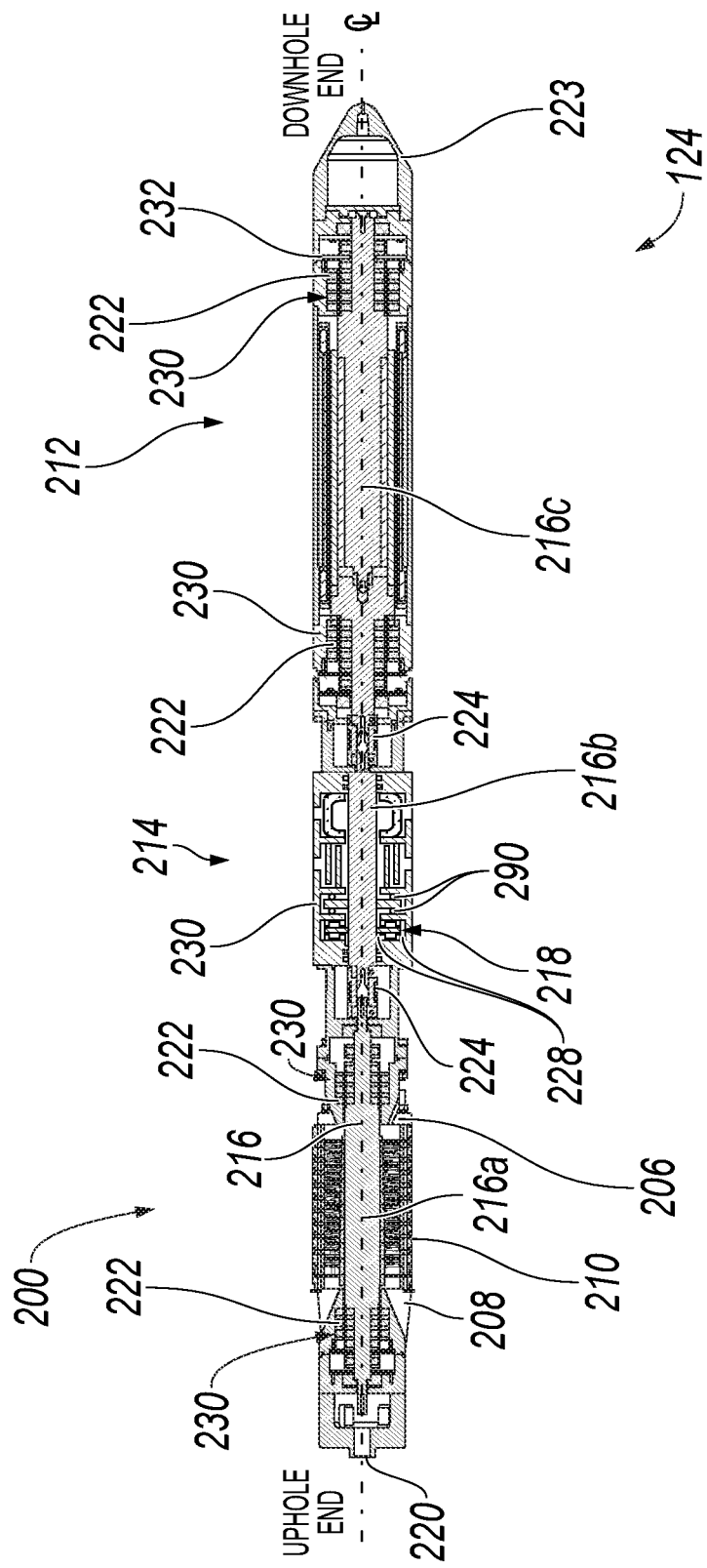
FIG. 2A is a schematic side half cross-sectional view of an example downhole-type system.

FIG. 2A shows a half side cross-sectional view of the example downhole-type system 124. In some implementations, the example downhole-type system 124 includes a blower 200, an electric machine 212, and a thrust bearing module 214. As mentioned previously, the downhole-type system 124 can include in addition to or instead of the blower 200, another type of rotating equipment, such as a pump (e.g. an electrical submersible pump). In the context of this disclosure, an uphole end or direction is an end nearer or moving in a direction towards the surface 106. A downhole end or direction is an end nearer of moving in a direction away from the surface 106. A coupling 220 is positioned at an uphole end of the system 124. The coupling can be of a type used for a wireline connection, a tubing connection, or any other connection configured to support the weight of the downhole-type system 124. The coupling 220 can include a standard attachment method to attach the system 124 to a support system. For example, a threaded interface can be used for sucker rod, or a set of bolts can be used to attach two flanges together for production tubing. The blower 200 includes an inlet 206 to receive a gas at the first pressure downhole of the blower 200 and an outlet 208 to output the gas at the second, higher pressure uphole of the blower 200. With the system 124 residing in the wellbore 104, the inlet 206 is at a downhole end of the blower 200 and the outlet 208 is at an uphole end of the blower 200. At a downhole end of the system 124 is a conical tip 223. The conical tip 223 reduces the pressure drop across the system 124. In some implementations, the conical tip 223 can house electronics that can be used in aspects of operation of the system 124 or for sensors.

The central shaft 216 comprises multiple sub-sections coupled together: a blower rotor 216*a*, a thrust bearing 216*b*, and an electric rotor 216*c*. Each sub-section is joined together by a coupling 224. The coupling 224 can be a bellows, quill, diaphragm, spline, or other coupling type. In certain instances, the coupling 224 can allow for angular misalignment of 0.30-2.0 degrees, and a lateral misalignment of 0.01 inches. Variation in thermal growth can be designed to be accepted in the compressor and motor clearances, though the coupling can tolerate about 0.03 inches of axial misalignment. In some implementations, the central shaft 216 can include a single, unitary shaft that runs through the blower 200, the thrust bearing module 214, and the electric machine 212.

The downhole-type system 124 includes a central shaft 216. The central shaft 216 is not physically coupled the outer housing 210 during normal operation; there is no physical connection between the central shaft 216 and the outer housing 210. In other words, the shaft is spaced apart from the housing 210 and any associated mechanism connected to the housing 210 with a radial gap between the central shaft 216 and the housing 210. The central shaft 216 can be coupled to multiple components, such as an electric machine 212 and the blower 200. The electric machine 212 is configured to rotatably drive or be driven to generate electricity by the blower 200. The central shaft 216 is levitated and axially supported in whole or in part by one or more active magnetic thrust bearing assemblies 218 located in the thrust bearing module 214. While one of each electric machine 212, thrust bearing module 214, and blower 200 modules are shown, more than one of each or all are practical in this configuration, thus allowing for additional motor power, additional thrust load support, and additional flow or pressure capacity to be added independently of each other to best produce the specific well performance. In addition, while the order of electric machine 212, thrust bearing module 214, and blower 200 module from downhole to uphole is shown, each module functions independently and can be placed in other orders that best suit the operation and integration of each module. Additionally, while a blower 200 is shown, this can be replaced with a compressor, a liquid pump, a multiphase pump, or a combination thereof that best suits the fluids and conditions of the well to maximize well performance. In addition, the use of active magnetic thrust bearing assemblies 218 can be seen as one example of such an implementation of magnetic bearings, where passive magnetic bearings or mechanical bearings, such as fluid film or ball bearing, can be used instead of or in addition to, in any case to enhance the downhole system performance.

The thrust bearing module 214 includes one or more magnetic thrust bearings 218 and a mechanical thrust bearing 290, both of which are coupled to the rotor (that is, the rotatable central shaft). The magnetic thrust bearing 218 and the mechanical thrust bearing 290 can be located in and exposed to the same environment, that is, the magnetic thrust bearing 218 and the mechanical thrust bearing 290 can be exposed to the same fluids within the downhole-type system 124. For example, even though the magnetic thrust bearing 218 does not rely on a barrier fluid to operate, the magnetic thrust bearing 218 can operate in the same environment as the mechanical thrust bearing 290 in a protected section flooded with a barrier fluid. With the relatively large clearances possible between rotor and stator components with magnetic bearings (for example, clearances of 1-3 millimeters), fluid can flow past the magnetic bearing with relatively low restriction, even when small particles are present in the fluid. Therefore, flooded designs where process fluid is present in the clearance and where the process fluid is designed to flow through the clearances (between rotor and stator components) under normal operation are possible with the use of magnetic bearings. The need for seals to limit fluid flow or for filtering particles at bearing locations within the system can be eliminated, thereby simplifying the overall design of the downhole-type system and integration of the magnetic bearings.

The mechanical thrust bearing 290 can be any conventional mechanical thrust bearing, such as a fluid film bearing. The magnetic thrust bearing 218 and the mechanical thrust bearing 290 can cooperate to fully support the central shaft 216. As long as both the magnetic thrust bearing 218 and the mechanical thrust bearing 290 are coupled to the central shaft 216, the magnetic thrust bearing 218 and the mechanical thrust bearing 290 can optionally be located at different locations within the downhole-type system 124. For example, if the mechanical thrust bearing 290 is a fluid film bearing, then the mechanical thrust bearing 290 will be isolated with a barrier fluid, but because the magnetic thrust bearing 218 allows for flooded, flow through, or fully sealed operation, the magnetic thrust bearing 218 can be located in another portion of the downhole-type system 124. The magnetic thrust bearing 218 can support a first portion of axial load of the rotor during rotor rotation, and the mechanical thrust bearing 290 can support a second (remaining) portion of the axial load of the rotor during rotor rotation. In some cases, the magnetic thrust bearing 218 can support an axial load up to an axial load threshold, and the mechanical thrust bearing 290 can cooperate with the magnetic thrust bearing 218 to support an axial load that is at least greater than the axial load threshold. In such cases, the magnetic thrust bearing 218 can be considered to be the primary thrust bearing, and the mechanical thrust bearing 290 can be considered to be the secondary (or backup) thrust bearing.

For example, if the axial load required to support (that is, maintain axial levitation of) the central shaft 216 is 10,000 Newtons (N) due to an encounter with a gas pocket in the process fluid, then the magnetic thrust bearing 218 can support axial loads up to a threshold value, such as 5,000 N. Since the axial load is greater than the threshold value, the rotor will move toward the mechanical thrust bearing 290, and the mechanical thrust bearing 290 can support the remaining axial load (in this case, 5,000 N) in order to maintain the axial position of the rotor within a desired position range within the downhole-type system 124. This approach can reduce transient load events on the mechanical thrust bearing 290 and can therefore reduce wear and potentially allow for longer operating life and increased reliability of the thrust bearing. Magnetic bearings are load limited, that is, once they reach their magnetic saturation limit they will not support any additional load. Prior to reaching this saturation limit, magnetic bearings perform in a linear load fashion and become non-linear above the saturation limit.

For example, a thrust bearing can have a 500 N force constant (amount of force output per unit of current applied), up to a load limit of 5,000 N. Within this range, the magnetic thrust bearing force per unit current is linear. For example, at a current of 1 amp, the applied force is 500 N; at 2 amps, the force is 1,000 N; and scaling accordingly up to 5,000 N. For currents over 10 amps, the applied force does not remain linear, as the magnetic materials that make up the actuator begin to approach the saturation limit (depending on the specific design). For example, at a current of 11 amps, the force applied may be 5,300 N; at 12 amps, the force may be 5,400 N; and at 13 amps, the force may be 5,420 N. A current limit is typically set in the controller 150 to keep the thrust bearing working in the linear range (below the saturation limit) or at another optimal operating load range. During loads that exceed the maximum design load of the thrust bearings, the current from the controller is limited to a maximum value (for the above example, the limit would be 10 amps). Thus, for load conditions where the thrust load is over 5,000 N (for example 7,000 N), the controller would limit the magnetic bearing to 5,000 N and allow the rotor to adjust its position, such that the mechanical bearing could support the rotor (in which the mechanical bearing would support the remaining load of 2,000 N). The magnetic bearing would continue to provide its maximum load, and when the thrust load decreases to 5,000 N or less, the magnetic bearing would pull the rotor back to its target position and relieve the mechanical bearing of providing thrust load support.

In some implementations, the mechanical thrust bearing 290 can support an axial load up to an axial load threshold, and the magnetic thrust bearing 218 can cooperate with the mechanical thrust bearing 290 to support an axial load that is at least greater than the axial load threshold. In such cases, the mechanical thrust bearing 290 can be considered to be the primary thrust bearing, and the magnetic thrust bearing 218 can be considered to be the secondary (or backup) thrust bearing. This approach can be used to not only reduce the net load supported by the mechanical thrust bearing 290, but also reduce the rate of change in axial loads supported by the mechanical thrust bearing 290. An active magnetic thrust bearing can react quickly to sudden changes in axial loads (for example, in less than 0.01 seconds). The magnetic thrust bearing 218 can slowly reduce the amount of axial force exerted on the rotor 216, thereby slowly "handing off" the axial load to the mechanical thrust bearing 290 at a more optimal rate (that is, slower rate) which can reduce the amount of wear and the potential of impact damage on the mechanical bearing 290 due to high loads changing at a quick rate, which can happen, for example, when gas pockets are encountered in the produced liquid.

The magnetic thrust bearing 218 can be a passive magnetic bearing or an active magnetic bearing. In cases where the magnetic thrust bearing 218 is an active magnetic bearing, the magnetic thrust bearing 218 can support dynamic loads, while the mechanical thrust bearing 290 can support static loads. The magnetic thrust bearing 218 can also support static loads. In response to a change in the axial load of the rotor on the mechanical thrust bearing 290, the magnetic thrust bearing 218 can apply an opposing axial load to the rotor during rotor rotation in order to compensate for the change in the axial load on the mechanical thrust bearing. In cases where the magnetic thrust bearing 218 is a passive magnetic bearing, the magnetic thrust bearing 218 can support static loads, while the mechanical thrust bearing 290 can support dynamic or static loads. The magnets on the central shaft 216 are configured to repel the magnets on the outer casing 210 allowing the shaft to be levitated and supported by the magnets. The downhole-type system 124 can include radial bearings.

Lubrication is not needed for the magnetic bearings, and because there are no lubrication or mechanical parts that have contamination concerns, no seals are needed for such components. Therefore, the magnetic thrust bearings 218 can be lubricant-free. Sensitive electronic and magnetic components can be packaged or otherwise isolated from the downhole environment without affecting their electromagnetic characteristics. There is a fluid path through the magnetic thrust bearing 218 that allow fluid to flow through an "air-gap" in each of the bearings. More specifically, the active magnetic thrust bearing assemblies 218 have gaps 228 between a bearing housing 230 and the central shaft 216. The gap is unsealed and is of sufficient size to allow fluid flow through the active magnetic thrust bearing assembly 218. The gaps 228 can be annular fluid gaps that are not simply exposed to the process fluid flowing through the downhole-type system 124, but the process fluid is actively flowed through the gaps 228. The process fluid flow through the gaps 228 allows for cooling of, for example, the rotor 216 and the bearings 218. The thrust bearing gaps 228 are sufficiently large to allow particulates to pass through without causing damage to rotating or stationary components. For example, in the illustrated implementation, an air-gap between the central shaft 216 (e.g., permanent magnet rotor 216c) and a stator of the electric machine 212 receives the fluid during operation of the downhole-type blower system 124. That is, an air-gap between the permanent magnet rotor 216c and the electric stator of the electric machine receives the fluid during operation of the electric machine. The bearings do not require seals as there is no physical contact between the rotor 216 and the outer case 210. In other words, the central shaft 216 is spaced apart from the outer housing 210 and is not mechanically connected to the outer housing 210.

In some instances, the following method can be used in conjunction with one or more implementations described within this disclosure. A working fluid, such as a production fluid, is flowed through a downhole-type device, such as the electric machine 212 positioned in the wellbore 104. The downhole-type device can include a rotor and a stator (such as the rotor 216c and the stator 210c). The rotor is supported within the stator, and the stator is spaced from the rotor such that an annular fluid gap is defined in-between. The fluid gap is in fluid communication with an outside environment exterior the downhole-type device, and the working fluid is flowed through the annular fluid gap.

Figure 2B:
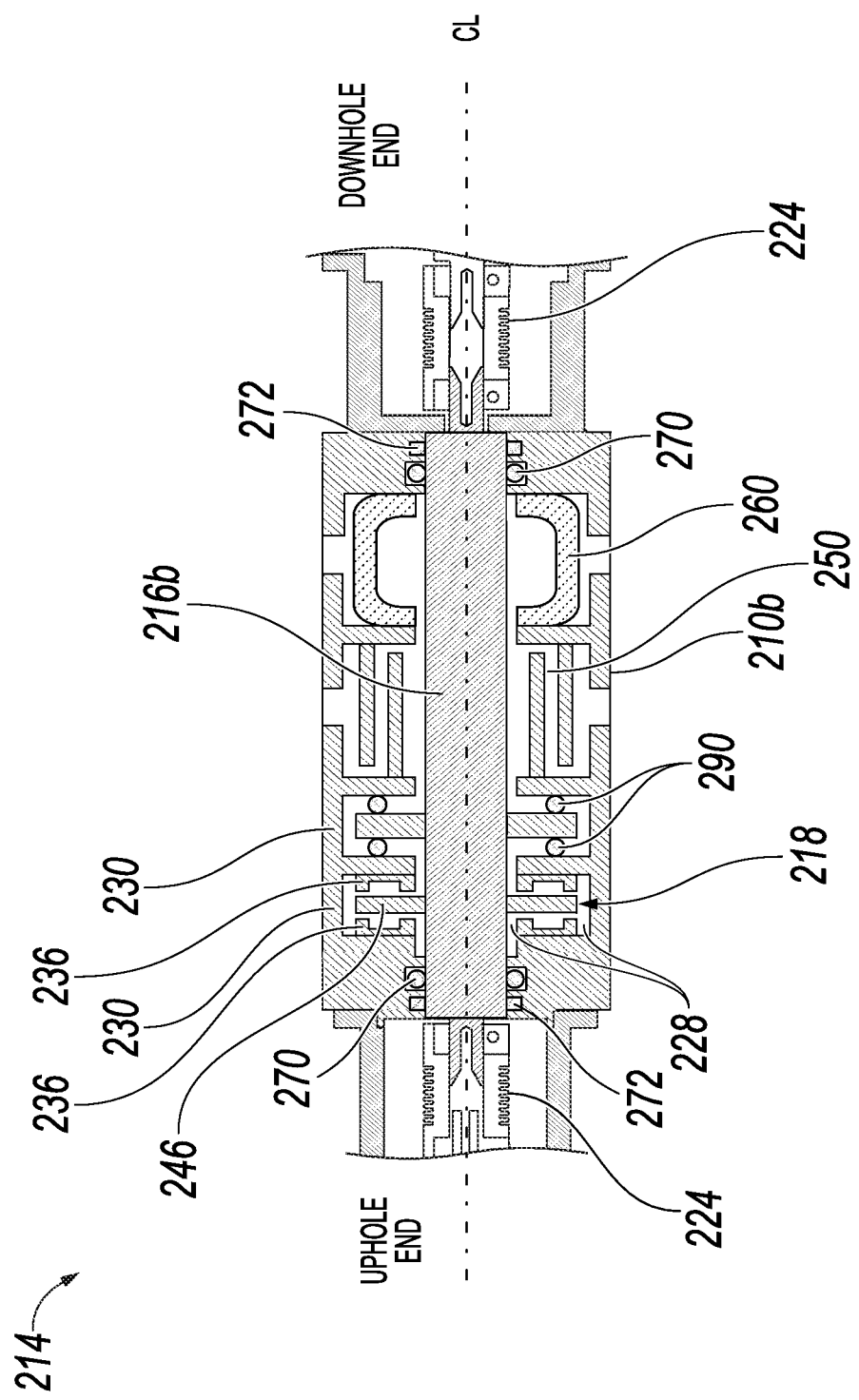
FIG. 2B is a schematic side half cross-sectional view of an example thrust bearing module of the downhole-type system in FIG. 2A.

FIG. 2B is a side cross-sectional view of an example thrust bearing module 214. As described previously, the magnetic thrust bearings 218 support a central rotor 216 (bearing rotor 216b) to a surrounding stator 210b. The magnetic thrust bearing 218 is configured to levitate and support a central rotor 216 axially within an outer housing 210 (surrounding stator 210b). The thrust bearing module 214 (or other portions of the downhole-type system 124, such as the blower 200) can include radial bearings 272 which are configured to support a central rotor 216 radially within an outer housing 210, for example, if the module 214 is coupled to another shaft (such as if the rotor 216b is connected to an associated shaft by a coupling 224 that does not provide radial support). The radial bearings 272 can be mechanical, such as fluid film bearings or ball bearings, or magnetic (for example, active magnetic bearings or passive magnetic bearings). Axial vibrations can be mitigated with active magnetic thrust bearings, or with an additional axial damping circuit (not shown). Although shown as being part of the downhole-type system 124, the thrust bearing module 214 can be implemented in any type of rotating equipment. The thrust bearing module 214 can replace or supplement a bearing system of a new or existing piece of equipment. A non-limiting example of a piece of equipment that can include the thrust bearing module 214 is an electric submersible pump (ESP).

The magnetic thrust bearing 218 can include a rotor target 246, that uses a permanent magnet for providing a magnetic field to energize the thrust bearing 218, attached to the rotor (such as the bearing rotor 216b) and an actuator 236 that surrounds the rotor 216b. The permanent magnet of the rotor target 246 can generate a magnetic field. This field produces attractive forces, pulling in both axial directions, but is inherently unstable. The actuator 236 (part of the stator 210b) can generate a magnetic field in response to receiving an electric current. The generated magnetic field can add to or subtract from the magnetic field generated by the permanent magnet of the rotor target 246 in the thrust bearing gaps between the rotor and stator poles. The magnetic field generated by the actuator 236 and the permanent magnetic field generated by the permanent magnet of the rotor target 246 can generate an attractive axial force between the stator 210b and the rotor 216b. By adjusting the electric current to the actuator 236, the axial position of the rotor 216b can be maintained within a target range. In this way, the magnetic bearings 218 can compensate for changes in axial loads.

A downhole system 124 can equalize pressure of a lubrication fluid to a downhole fluid while keeping the lubrication fluid relatively isolated from contamination by the downhole fluid for portions of the system that do not need to interact with the downhole fluid (or would be adversely affected by exposure to the downhole fluid). The lubrication fluid (such as lube oil) can be located within the housing 210b. The thrust bearing module 214 can include a flexible material 260 that can expand or compress to equalize pressure within and outside the material 260 and achieve pressure balance. The flexible material 260 can be, for example, a rubber bag, a diaphragm, or a flexible metallic barrier. The flexible material 260 can also serve to provide a barrier or seal between the lubrication fluid and the downhole fluid. As the downhole fluid pressure increases, the flexible material 260 compresses the lubrication fluid until the pressure of the lubrication fluid is equal to that of the downhole fluid, with no flow of downhole fluid into the lubrication fluid. The thrust bearing module 214 can also include a labyrinth chamber 250, which provides a tortuous path for the downhole fluid to enter the thrust bearing module 214 and mix with the lubrication fluid. In some implementations, the lubrication fluid leaves the thrust bearing module 214 and mixes with the downhole fluid. This labyrinth chamber 250 is another way to provide pressure equalization between the downhole fluid and the lubrication fluid. The lubrication fluid and the downhole fluid can balance in pressure, and the tortuous path of the labyrinth chamber 250 can prevent downhole fluid from flowing further into the module 214. The labyrinth chamber 250 can be implemented for vertical orientations of the downhole-type system 124. The thrust bearing module 214 can include face seals 270 at the ends of the rotor 216b which also isolate the lubrication fluid from downhole fluids. While not shown, the thrust bearing module isolation can be extended to, for example, an electric motor to isolate it from the downhole fluid, an ESP, or another downhole device by connecting the housings of both modules and preventing downhole fluid from entering the motor module while allowing lubrication fluid to enter the motor module. For example, the magnetic thrust bearings 218 and the mechanical thrust bearing 290 can both be located within the thrust bearing module 214 and be exposed to and share the same lubrication fluids. The thrust bearing module 214 can be connected to the electric machine 212, and both can be sealed from the downhole fluids. The magnetic thrust bearings 218 and the mechanical thrust bearing 290 cooperate to fully support the axial load of the rotating shaft 216 (rotor). As mentioned previously, radial bearings can be included to support the rotor and maintain a radial position of the rotor within the downhole-type system 124.

In some instances, position sensors (not shown) are required for an active magnetic bearing, such as for the thrust bearings 218, and can use conventional inductive, eddy current, capacitive, or other types of sensors. The sensors can detect an axial position of the rotor during rotor rotation in a downhole location and can generate (at the downhole location) a signal based on the detected axial position of the rotor. For example, the sensor can detect a gap (that is, a distance) between the sensor and a reference point (such as an end, disk, edge or a flange) on the shaft (such as rotor 216b) to determine an axial position of the shaft. In some implementations, the sensors can detect one or more pressures, such as an axial pressure on the mechanical thrust bearing 290 during rotor rotation in a downhole location and can generate (at the downhole location) a signal based on the detected pressure. In some cases, the sensors are configured to determine a pressure or a force on a component in the downhole location (for example, the mechanical thrust bearing 290). These sensors can be isolated from the environment to ensure operation over the time downhole. With conventional sensors, electronics could be installed downhole in the device or at a topside facility with sensor downhole. In some cases, the sensor and the magnetic bearings 218 are fluidically exposed to the downhole environment (that is, the process fluids present in the downhole location within the wellbore).

The position sensors can include a position sensitive generator, such as an axial gap generator, that is configured to generate a voltage signal based on a detected axial position of the rotor during rotor rotation. For example, the generator can produce a voltage proportional to the axial gap that can be used to determine axial position. This offers a high voltage output that can be transmitted over long distances to minimize line drop and noise issues. In some implementations, the sensors can include a pressure-sensitive generator that is configured to generate a voltage signal based on a detected pressure in the downhole environment (such as an axial pressure on the mechanical thrust bearing 290 during rotor rotation in a downhole location). Multiple approaches can be used to achieve a sensor downhole for the thrust bearing system, but all are unique in how they are integrated into the system to meet the operating environment. In some implementations, the sensor also includes a modulator configured to modulate the generated signal.

The thrust bearing module 214 compensates for any axial loads and maintains the axial position of the multiple module rotors by applying force to the rotor to maintain position or in response to a pressure present in the system 124, for example, on a pump or compressor. The downhole-type system 124 can include a controller 150 coupled to the magnetic thrust bearing 218. The controller 150 can be configured to determine an amount of axial force to apply to the rotor to maintain axial levitation of the rotor during rotor rotation, allocate a first portion of the determined amount of axial force to the magnetic thrust bearing 218 and a remaining portion of the determined amount of axial force to the mechanical thrust bearing 290, and transmit a signal corresponding to the first portion of the determined amount of axial force to the magnetic thrust bearing 218. For example, as loads are developed from the act of compressing or pumping fluids, the thrust bearing controller 150 senses position movement of the rotor from a target set point. The controller 150 then increases the current to magnetic bearing (such as the magnetic thrust bearings 218) that is converted to force on the rotor. This force is determined based on the amount of displacement sensed and the rate of change in motion using the specific control approach set by the controller 150. The thrust bearing 218 with controller 150 in cooperation with the mechanical thrust bearing 290 is thus able to compensate for forces on the rotor and apply corresponding off-setting forces to keep the rotor in an axial centered position. While a permanent magnet on the rotor configuration is described, various configuration of thrust bearing could be applied, including all electric or alternative permanent magnet configurations. The magnetic bearing can be configured to support all loads up to a maximum limit, and any higher loads are then shared and supported in conjunction with the mechanical bearing. In some implementations, the magnetic bearing supports only a portion of the static loads and operates in conjunction with the mechanical bearing to support the remaining loads. In some cases, the magnetic bearing does not normally support any of the static loads; instead, the magnetic bearing is utilized to sense changes or rapid spikes in pressure or position of the rotor, which would indicate rapid changes in axial load, and in such cases, the magnetic bearing can begin to apply forces to reduce the change in load supported by the mechanical bearing. This operation can be controlled and adjusted by the controller 150, depending on where the bearings are located and how the system 124 is designed to operate.

Although the magnetic thrust bearings 218 as shown in FIGS. 2A and 2B share an environment with the mechanical thrust bearing 290 (located within the electric machine 212), the magnetic thrust bearing 218 can optionally be separated from the mechanical thrust bearing 290 and not located within the thrust bearing module 214 of the downhole-type system 124. For example, the magnetic thrust bearings 218 can be located in a section of the thrust module 214 (or in a completely separate module), that is exposed to the downhole fluid while the mechanical thrust bearing 290 can both be located within the electric machine 212 or the thrust bearing module 214 and be exposed to the lubrication fluids, isolated from the downhole fluids. The magnetic thrust bearings 218 and the mechanical thrust bearing 290 cooperate to fully support the axial load of the rotating shaft 216 (rotor). As mentioned previously, radial bearings can be included to support the rotor and maintain a radial position of the rotor within the downhole-type system 124.

Figure 2C:
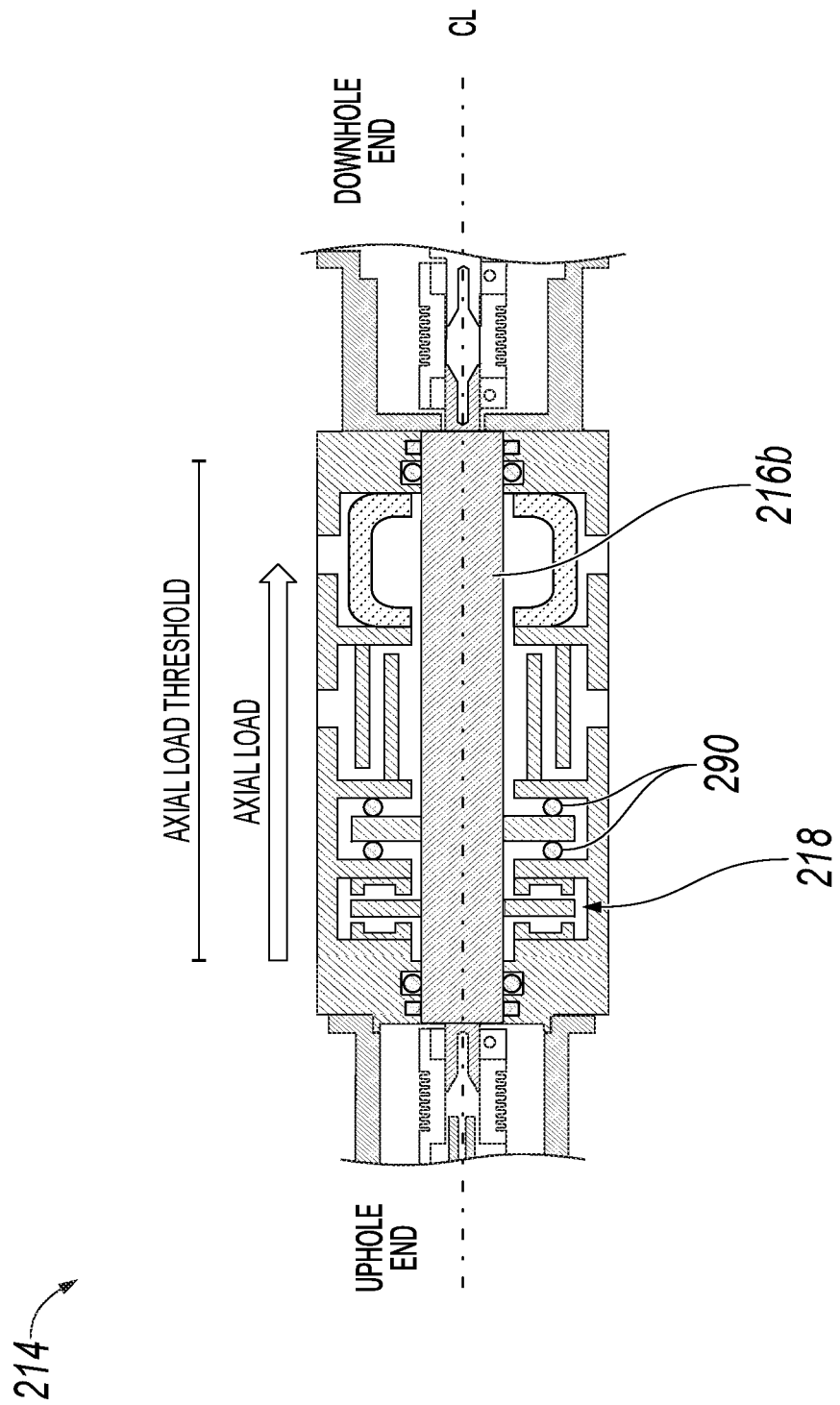
FIG. 2C is a schematic side half cross-sectional view of an example thrust bearing module of the downhole-type system in FIG. 2A.

As illustrated in FIG. 2C, the axial load of the rotor 216*b* can be axially supported by the magnetic thrust bearings 218 and the mechanical thrust bearing 290. In some implementations, the axial load threshold defines the magnetic thrust bearing 218 load capacity. Although shown in FIGS. 2A, 2B, 2C, and 2D as having one magnetic thrust bearing 218, the rotor 216*b* can be supported by one or more magnetic thrust bearings, along with the mechanical thrust bearing 290. In FIG. 2C, the entire axial load of the rotor 216*b* at this instance is supported by the magnetic thrust bearings 218. As mentioned previously, the magnetic thrust bearings 218 can be active and therefore can support dynamic loads (that is, changing axial loads of the rotor 216*b*). In this case, the mechanical thrust bearing 290 does not apply force onto the rotor 216*b* because the magnetic thrust bearings 218 can fully support the axial load of the rotor 216*b*. In other words, the magnetic thrust bearings 218 support the axial load of the rotor 216*b* without needing help from the mechanical thrust bearing 290 in this instance because the axial load does not exceed the axial load threshold.

Figure 2D:
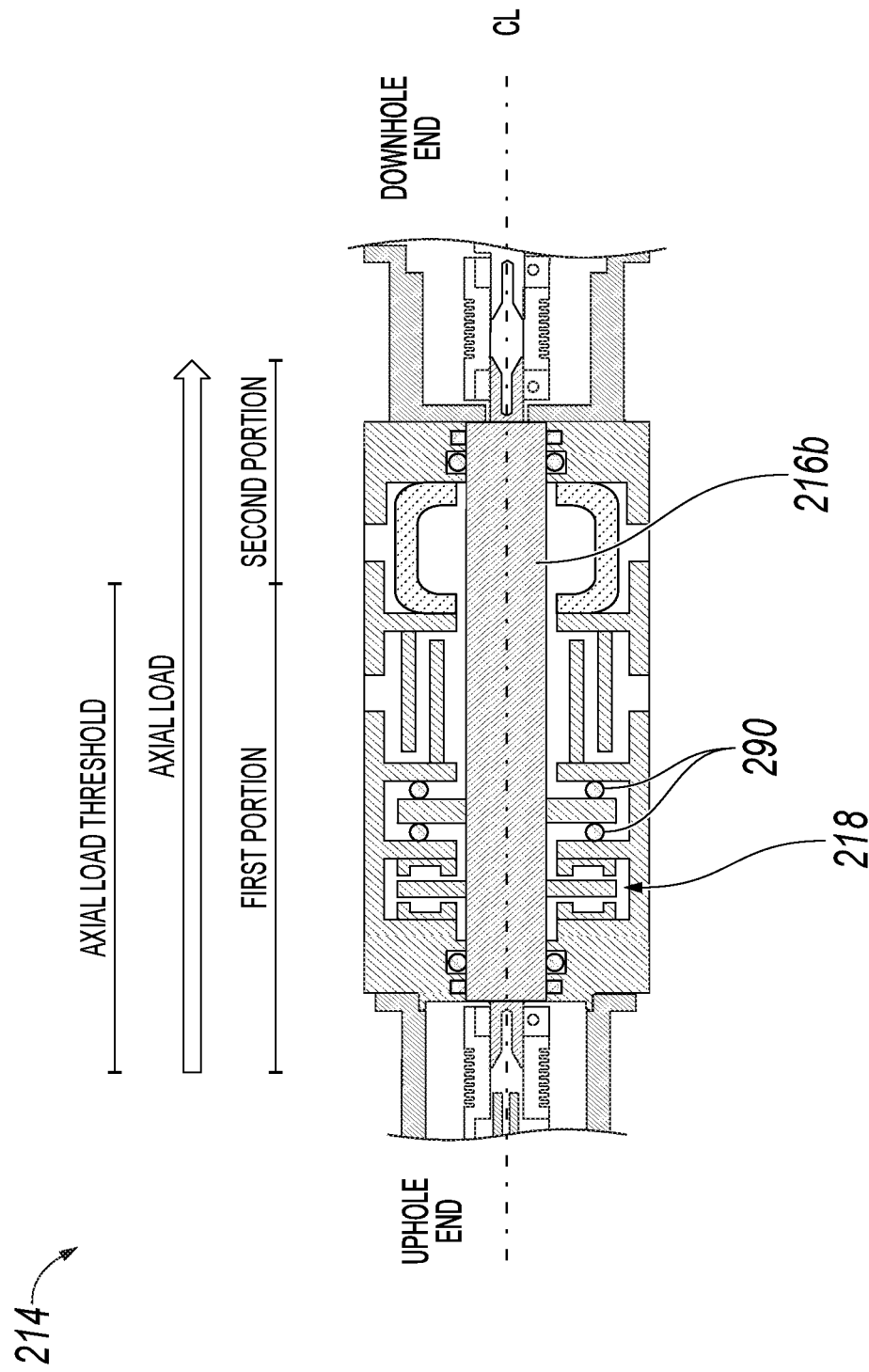
FIG. 2D is a schematic side half cross-sectional view of an example thrust bearing module of the downhole-type system in FIG. 2A.

In FIG. 2D, the axial load exceeds the axial load threshold, for example, due to an upset scenario, such as encountering a gas pocket during production. Therefore, the magnetic thrust bearings 218 and the mechanical thrust bearing 290 cooperate to support the axial load of the rotor 216*c*. A first portion of the axial load (up to the axial load threshold) is supported by the magnetic thrust bearings 218. A second portion of the axial load (that is, the remainder of the axial load) is supported by the mechanical thrust bearing 290. When the axial load of the rotor 216*c* decreases below the axial load threshold, the axial load of the rotor 216*c* can, again, be fully supported by the magnetic thrust bearings 218, as shown in FIG. 2C.

Figure 3:
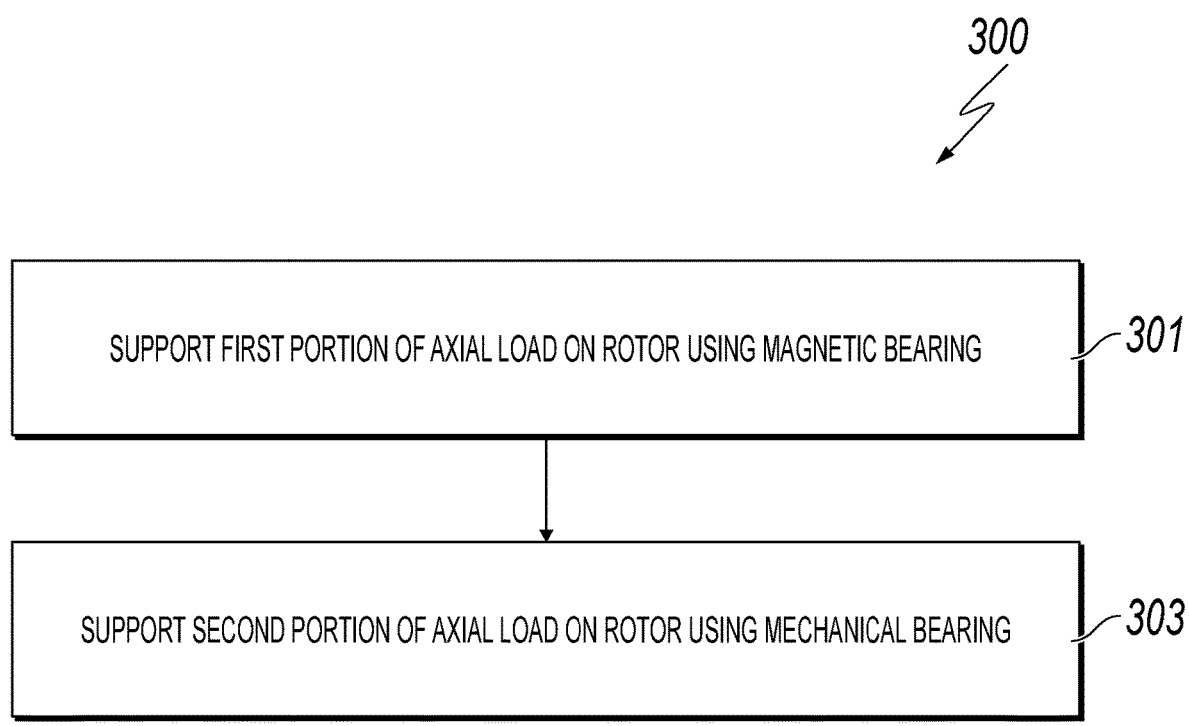
FIG. 3 is flow chart of an example method for supporting an axial load of a rotor of a downhole-type system.

The components described previously within this disclosure can be used to implement the example method 300 shown in FIG. 3. At 301, a first portion of an axial load on a rotating rotor (such as the central shaft 216) of a downhole-type rotating machine (such as the downhole-type system 124) is supported using a magnetic thrust bearing (such as the magnetic thrust bearing 218). Supporting the first portion of the axial load can include supporting the axial load up to an axial load threshold using the magnetic thrust bearing 218. Supporting the first portion of the axial load using the magnetic thrust bearing 218 can include determining a change in axial load of the rotor 216 on the mechanical thrust bearing 290 and applying an opposing axial to the rotor 216 during rotor rotation using the magnetic thrust bearing 218 in order to compensate for the change in the axial load on the mechanical thrust bearing 290.

At 303, a second portion of the axial load of the rotating rotor is supported using a mechanical thrust bearing (such as the mechanical thrust bearing 290). Supporting the second portion of the axial load can include supporting an axial load that is at least greater than the axial load threshold with the mechanical thrust bearing 290 in cooperation with the magnetic thrust bearing 218. In some implementations, the mechanical thrust bearing 290 can support the first portion of the axial load. The magnetic thrust bearing 218 can determine a change in axial load of the rotor 216 on the mechanical thrust bearing 290 and apply an opposing axial force to the rotor 216 during rotor rotation. The magnetic thrust bearing 218 can compensate for the change in the axial load on the mechanical thrust bearing 290, at first fully or partially compensating for the load, and then, over a determined time or rate of change, hand off or transition the load to the mechanical bearing, thereby slowing the rate of change of the load on the mechanical bearing. This compensation by the magnetic thrust bearing 218 prevents the mechanical bearing 290 from experiencing fast rates of change in load fluctuations, which can extend the operating life of the mechanical bearing 290. In some implementations, the mechanical thrust bearing 290 can support the first portion of the axial load. A second portion of the axial load of the rotating rotor is supported using a magnetic thrust bearing (such as the magnetic thrust bearing 218). Supporting the second portion of the axial load can include supporting an axial load that is at least greater than an axial load set point with the magnetic thrust bearing 218 in cooperation with the mechanical thrust bearing 290. In some implementations, the method 300 includes generating a magnetic field in response to receiving an electric current and generating an axial force on the rotor in response to the generated magnetic field. In some implementations, the method 300 includes detecting an axial position of the rotating rotor in a downhole location (using, for example, a sensor) and transmitting a position signal based on the detected axial position. In some cases, the position signal is modulated before the position signal is transmitted.

The subject matter described in this disclosure can be implemented as an electrical submersible pump including a stator, a rotor supported by the stator and configured to rotate within the stator, and a bearing assembly. The bearing assembly includes a magnetic thrust bearing coupled to the rotor and a mechanical thrust bearing coupled to the rotor. The magnetic thrust bearing is configured to support a first portion of an axial load of the rotor during rotor rotation, and the mechanical thrust bearing is configured to support a second portion of the axial load of the rotor during rotor rotation. The magnetic thrust bearing can be configured to support an axial load up to an axial load threshold, and the mechanical thrust bearing can be configured to cooperate with the magnetic thrust bearing to support an axial load that is at least greater than the axial load threshold. The magnetic thrust bearing can be configured to support an axial load in response to a change in axial load of the rotor on the mechanical thrust bearing, the magnetic bearing can apply an opposing axial load to the rotor during rotor rotation in order to compensate for the change in axial load on the mechanical thrust bearing. The mechanical thrust bearing can be configured to support an axial load up to an axial load threshold, and the magnetic thrust bearing can be configured to cooperate with the mechanical thrust bearing to support an axial load that is at least greater than the axial load threshold. The magnetic thrust bearing can be configured to support an axial load in a combination of manners consistent with those described, for example, the magnetic thrust bearing can be configured to support an axial load up to an axial load threshold, and support axial loads in response to changes in axial load of the rotor, all within the axial load threshold.

While some examples of the subject matter have been disclosed, aspects of this disclosure can describe other implementations. For example, in some implementations, the central shaft rotates at a sub-critical speed below a first harmonic of the central shaft. In some implementations, the central shaft can include a single, continuous shaft. Active and/or passive damping systems can be used on the passive magnetic radial bearings, the active magnetic thrust bearings, or both. In instances where a passive damping system is used, a highly electrically conductive metal plate, such as a copper plate, can be used. In such an instance, the movement of the rotor generates eddy currents on a copper plate. The eddy currents in turn generate a magnetic field that opposed the field in the rotor, resulting in a force applied to the rotor opposite that of the motion, reducing the motion. The faster and larger the motion, the larger the force generated on the plate in response to the motion.

The techniques described here can be implemented to yield a construction that is simple, inexpensive, and physically robust. The system can be deployed without special hydraulic or electrical requirements and can be easily retrievable with minimum or no risk of being stuck in the wellbore. The concepts described herein with respect to a blower could also be applied to a compressor, having a higher pressure ratio and lower throughput, a pump, or a multiphase system where the fluid is a combination of liquid and gas. While this disclosure has been described in the context of production applications, it can also be used in injection applications. For example, the described systems can be used to inject fluid into a reservoir to maintain a production pressure on the reservoir.

A number of implementations have been described. Nevertheless, it will be understood that various modifications may be made. Accordingly, other implementations are within the scope of the following claims.

What is claimed is:

1. A downhole-type system comprising:
   a rotatable rotor;
   a magnetic thrust bearing coupled to the rotor;
   a mechanical thrust bearing coupled to the rotor; and
   a controller coupled to the magnetic thrust bearing, the controller configured to:
   determine an amount of axial force to apply to the rotor;
   allocate a first portion of the determined amount of axial force to the magnetic thrust bearing and a remaining portion of the determined amount of axial force to the mechanical thrust bearing, wherein the first portion and the remaining portion of the determined amount of axial force correspond to the first portion and the second portion of the axial load supported by the magnetic thrust bearing and the mechanical thrust bearing, respectively; and
   transmit a signal to the magnetic thrust bearing, the signal corresponding to the first portion of the determined amount of axial force.

2. The system of claim 1, wherein the magnetic thrust bearing is configured to support an axial load up to an axial load threshold, the mechanical thrust bearing configured to cooperate with the magnetic thrust bearing to support an axial load at least greater than the axial load threshold.

3. The system of claim 1, wherein the magnetic thrust bearing is configured to support dynamic loads, and the mechanical thrust bearing is configured to support static loads.

4. The system of claim 1, wherein the mechanical thrust bearing is configured to support an axial load up to an axial load threshold, the magnetic thrust bearing configured to cooperate with the mechanical thrust bearing to support an axial load at least greater than the axial load threshold.

5. The system of claim 1, wherein, in response to a change in the axial load of the rotor on the mechanical thrust bearing, the magnetic thrust bearing is configured to apply an opposing axial load to the rotor during the rotor rotation to compensate for the change in the axial load on the mechanical thrust beating.

6. The system of claim 1, wherein the magnetic thrust bearing is lubricant-free.

7. The system of claim 1, wherein the magnetic thrust beating is configured to share an environment with the mechanical thrust bearing.

8. The system of claim 1, wherein the magnetic thrust bearing comprises:
a permanent magnet attached to the rotor, the permanent magnet configured to generate a permanent magnetic field; and
an actuator surrounding the rotor, the actuator configured to generate a magnetic field in response to receiving an electric current.

9. The system of claim 1, further comprising a sensor configured to:
detect a pressure during the rotor rotation in a downhole location, and
generate, at the downhole location, a signal based on the detected pressure.

10. The system of claim 9, wherein the sensor comprises a generator configured to generate a voltage signal based on the detected pressure.

11. The system of claim 1, further comprising a sensor configured to:
detect an axial position of the rotatable rotor during the rotor rotation in a downhole location, and
generate, at the downhole location, a signal based on the detected axial position.

12. The system of claim 10, wherein the sensor and the magnetic bearing is fluidically exposed to a downhole environment.

13. The system of claim 10, wherein the sensor comprises one of an inductive sensor, a pressure sensor, and a force sensor.

14. The system of claim 10, wherein the sensor comprises a generator configured to generate a voltage signal based on the detected axial position.

15. The system of claim 10, wherein the sensor comprises a modulator configured to modulate the signal.

16. A method comprising:
determining an amount of axial force to apply to a rotor of a downhole-type; rotating machine;
allocating as first portion of the determined amount of axial force to a magnetic thrust bearing and a remaining portion of the determined amount of axial force to a mechanical thrust bearing;
transmitting a signal to the magnetic thrust bearing, the signal corresponding to the first portion of the determined amount of axial force;
supporting a first portion of an axial load of the rotor using the magnetic thrust bearing, the first portion of the axial load equal to the first portion of the determined amount of axial force; and
supporting a second portion of the axial load of the rotor using the mechanical thrust bearing, the second portion of the axial load equal to the remaining portion of the determined amount of axial force.

17. The method of claim 16, wherein supporting the first portion of the axial load using the magnetic thrust bearing comprises supporting the axial load up to an axial load threshold, and supporting the second portion of the axial load using the mechanical thrust bearing comprises supporting, by the mechanical thrust bearing in cooperation with the magnetic thrust bearing, an axial load that is at least greater than the axial load threshold.

18. The method of claim 16, wherein supporting the first portion of the axial load using the magnetic thrust bearing comprises:
determining a change in axial load of the rotor on the mechanical thrust bearing; and
in response to determining the change in the axial load on the mechanical thrust bearing, applying, by the magnetic thrust bearing, an opposing axial load to the rotor during the rotor rotation to compensate for the change in the axial load on the mechanical thrust bearing.

19. The method of claim 16, further comprising:
generating a magnetic field in response to receiving an electric current; and
generating an axial force on the rotor in response to the generated magnetic field.

20. The method of claim 16, further comprising:
detecting an axial position of the rotating rotor in a downhole location; and
transmitting a position signal based on the detected axial position.

21. The method of claim 20, further comprising modulating the position signal before transmitting the position signal.

22. A downhole-type system comprising:
a rotatable rotor;
a passive magnetic thrust bearing coupled to the rotor, the passive magnetic thrust bearing configured to support a first portion of an axial load in a first direction determined by the orientation of the passive magnetic thrust beating respective to the rotor; and
a mechanical thrust beating coupled to the rotor, the mechanical thrust bearing configured to support a second portion of the axial load in the first direction and an axial load in a second direction opposite the first direction, wherein the magnetic thrust bearing is configured to cooperate with the mechanical thrust bearing to support an axial load that is greater than an axial load threshold.

23. The system of claim 22, wherein the first portion of the axial load in the first direction is a static load, and the second portion of the axial load in the first direction is a dynamic load.

* * * * *

UNITED STATES PATENT AND TRADEMARK OFFICE
CERTIFICATE OF CORRECTION

PATENT NO. : 10,630,139 B2
APPLICATION NO. : 15/974460
DATED : April 21, 2020
INVENTOR(S) : David Biddick, Patrick McMullen and Kuo-Chiang Chen It is certified that error appears in the above-identified patent and that said Letters Patent is hereby corrected as shown below:

In the Claims

Column 18, Line 67, Claim 5, delete "beating." and insert -- bearing. --;

Column 19, Line 4, Claim 7, delete "beating" and insert -- bearing --;

Column 19, Line 42, Claim 16, delete "downhole-type;" and insert -- downhole-type --;

Column 20, Line 42, Claim 22, delete "beating" and insert -- bearing --;

Column 20, Line 43, Claim 22, delete "beating" and insert -- bearing --.

Signed and Sealed this
Twenty-first Day of July, 2020

Andrei Iancu
*Director of the United States Patent and Trademark Office*